United States Patent [19]
Buschulte

[11] Patent Number: 5,481,152
[45] Date of Patent: Jan. 2, 1996

[54] PIEZOELECTRIC ACTUATOR

[75] Inventor: Rainer Buschulte, Bad Schönborn, Germany

[73] Assignee: Heidelberger Druckmaschinen AG, Heidelberg, Germany

[21] Appl. No.: 255,479

[22] Filed: Jun. 8, 1994

[30] Foreign Application Priority Data

Jun. 8, 1993 [DE] Germany ............ 43 18 978.4

[51] Int. Cl.⁶ ............................................ H01L 41/08
[52] U.S. Cl. ............................................. 310/328; 310/369
[58] Field of Search .................................... 310/328, 369

[56] References Cited

U.S. PATENT DOCUMENTS

| | | | |
|---|---|---|---|
| 2,939,106 | 5/1960 | Mason | 310/328 |
| 3,215,078 | 11/1965 | Stec | 310/328 |
| 3,719,939 | 3/1973 | Geil et al. | 340/261 |
| 4,011,474 | 3/1977 | O'Neill | 310/328 |
| 4,499,479 | 2/1985 | Chee-Shuen Lee et al. | 346/140 R |
| 4,519,751 | 5/1985 | Beckman et al. | 417/322 |
| 4,525,645 | 6/1985 | Shirley et al. | 310/337 |
| 4,586,018 | 4/1986 | Bettman | 338/42 |
| 4,917,579 | 4/1990 | Torma | 417/322 |
| 4,957,136 | 9/1990 | Gavrila | 137/488 |
| 4,996,675 | 2/1991 | Beauducel | 367/162 |
| 5,103,130 | 4/1992 | Rolt et al. | 310/337 |
| 5,199,004 | 3/1993 | Monahan | 367/157 |

FOREIGN PATENT DOCUMENTS

| | | | |
|---|---|---|---|
| 140946 | 12/1978 | German Dem. Rep. | H01L 2/10 |
| 4133000 | 4/1993 | Germany | G09B 21/02 |
| 63-169779 | 7/1988 | Japan | H01L 41/02 |
| 3-239165 | 10/1991 | Japan | H02M 7/537 |
| 1123070 | 11/1984 | U.S.S.R. | H01L 41/08 |
| 1453978 | 10/1976 | United Kingdom | 310/328 |

Primary Examiner—Thomas M. Dougherty
Attorney, Agent, or Firm—Herbert L. Lerner; Laurence A. Greenberg

[57] ABSTRACT

Piezoelectric actuator having at least one piezoelectric element assigned to an electrode for applying a control voltage includes a hollow body having a volume filled with an incompressible liquid, an elastic membrane closing an opening formed in the hollow body, and a device for controlling the piezoelectric element so as to vary the volume of the hollow body during a deformation of the elastic membrane caused by the incompressible liquid.

17 Claims, 3 Drawing Sheets

PIEZOELECTRIC ACTUATOR

The invention relates to a piezoelectric actuator having at least one piezoelectric element assigned to an electrode for applying a control voltage.

German Published Non-Prosecuted Patent Application 41 16 990 discloses a piezoelectrically displaced linear actuator having several piezoelectric elements which are arranged in a particular manner with respect to one another for the purpose of achieving a greatest possible adjustment range. The adjustment path of the actuator is capable of being varied in accordance with a control voltage, a layout for an especially long adjustment path leading to the capability of applying only relatively small adjustment forces.

Construction principles for piezoelectric actuators, which serve for producing adjustment forces which are as great as possible and which consequently permit only a relatively short adjustment path, have further become known heretofore from the state of the art.

It is accordingly an object of the invention to provide a piezoelectric actuator of the aforementioned general type which permits the application of relatively large adjustment forces as well as the provision of relatively long adjustment paths. Furthermore, very rapid adjustment movements are permissible thereby. In addition, a possibility is afforded, with relatively simple manufacture and construction, of enabling the provision of an adjustment path of maximum length by relatively simple measures.

With the foregoing and other objects in view, there is provided, in accordance with the invention, a piezoelectric actuator having at least one piezoelectric element assigned to an electrode for applying a control voltage, comprising a hollow body having a volume filled with an incompressible liquid, an elastic membrane closing an opening formed in the hollow body, and means for controlling the piezoelectric element so as to vary the volume of the hollow body during a deformation of the elastic membrane caused by the incompressible liquid. This deformation of the membrane corresponds to the adjustment path, i.e., a change in length which is set, for example, by the outward bulging or arching of the membrane is employable as the adjustment path. A transformation of force and volume variation occurs in accordance with the invention, as a result of the incompressible liquid which is used. The piezoelectric element acts upon the liquid which transmits the force effect without direction, i.e., omnidirectionally, so that the deformation of the membrane occurs. The hollow body is preferably dimensioned so that no or only insignificant deformations occur therein due to the force application, so that only or substantially only the membrane deflects. In this manner, rapid adjustment movements with large forces and also long adjustment paths, for example, >100 μm, are possible.

In accordance with another feature of the invention, the hollow body is formed with at least one wall, the piezoelectric element forming at least one section of the hollow-body wall. When activated by the control voltage, the one section changes its position, i.e., a change in the hollow-body wall is produced in this region. A change in the volume of the hollow body thereby occurs, so that the membrane is deflected outwardly due to the constantly maintained volume of the incompressible liquid. By using the expression "at least one wall", applicant intends to express the thought that it is also possible for the piezoelectric element to form the entire wall defining a hollow chamber within the hollow body or to form the entire hollow body.

In accordance with a further feature of the invention, the hollow body is formed of piezoelectric material.

In accordance with an added feature of the invention, at least the one section of the hollow-body wall is coated with an electrode. Indeed, at least some regions of the hollow-body inner and outer surfaces may have electrodes connected thereto for applying the control voltage.

In accordance with an additional feature of the invention, the wall is an outer casing defining a hollow chamber in the hollow body, and the piezoelectric element forms at least one region of a surface of the outer casing, the surface region being coated with another electrode. Other sections or even the entire hollow-body wall may be coated with one of the electrodes. Preferably, the other electrode is located at another region of the piezoelectric element. The piezoelectric element can preferably form at least one region of the outer casing surface of the hollow chamber, the one region being provided or especially coated with the other electrode.

In accordance with yet another feature of the invention, the hollow body is formed of at least one tube. Preferably, this involves a piezo-tube, i.e., a tube formed of piezoelectric material. If such a tube, which has one electrode on the outer casing surface thereof and another electrode on the inner casing surface thereof, is electrically triggered, length and diameter relationships or ratios change, i.e., if the length is extended, the diameter becomes smaller, and if the length is diminished, the diameter becomes larger. By relatively simple dimensioning of the length and the diameter, as well as areal dimensioning of the membrane, the desired adjustment path of the actuator can thus be determined.

In accordance with yet a further feature of the invention, the electric membrane is disposed at an end of the one tube. This may be effected directly, in that it, as it were, forms the end face of the tube or, however, indirectly by using an intermediate member. The intermediate member permits the direction of the adjustment movement to be varied in a desired manner with respect to the main axis of the actuator, i.e., the longitudinal axis of the tube, in that the intermediate member is communicatingly connected with the hollow chamber of the hollow body and is also filled with incompressible liquid. At a suitable location, thus also at an angle to the main axis of the actuator, the membrane is disposed so that the desired direction of adjustment movement can be attained. In this regard, it is advantageous that the deflection of the force direction is completely problem-free as a result of the incompressible liquid.

In accordance with still another feature of the invention, the actuator includes another tube, one of the tubes being received within the other.

In accordance with still a further feature of the invention, the tubes are coaxially disposed.

The hollow chamber extends substantially between the outer casing surface of the inner tube and the inner casing surface of the outer tube.

In accordance with still an added feature of the invention, the at least one tube is formed of piezoelectric material. In fact, both of the tubes may be formed of piezoelectric material. The electrodes for triggering the control voltage are disposed on the inner casing surfaces as well as the outer casing surfaces of the tubes.

In accordance with still an additional feature of the invention, at least part of a hollow chamber is defined between an outer casing surface of the inner tube and an inner casing surface of the outer tube.

In accordance with another feature of the invention, the inner tube is formed shorter than the outer tube, and surface means are included for closing a first end of the inner tube, the closing surface means forming a section of walls defining the hollow chamber.

In accordance with a further feature of the invention, the membrane is disposed at a first end of the outer tube at a spaced distance opposite from the first end of the inner tube.

In accordance with an added feature of the invention, the actuator includes a sealing ring closing the hollow chamber in vicinity of respective second ends of the two tubes, the sealing ring being disposed between the outer casing surface of the inner tube and the inner casing surface of the outer tube, thereby sealing off the hollow chamber between the two tubes. Both of the second ends of the tubes which are received within one another are mutually aligned.

The membrane is disposed spaced from and opposite the first end of the inner tube, i.e., the closure surface thereof, the membrane being mounted on the assigned first end of the outer tube or being assigned to this end. Being assigned denotes that also here, insofar as is necessary, an intermediate member may be provided which carries the membrane.

In accordance with an additional feature of the invention, the actuator includes respective electrodes coating the outer casing surface of the inner tube, and the inner casing surface of the outer tube, the sealing ring forming an electrical connecting element for the electrodes.

A third electrode is is disposed on the outer casing surface of the outer tube, and a fourth electrode on the inner casing surface of the inner tube.

In accordance with yet another feature of the invention, the actuator includes an adapter for deflecting the operating direction of the actuator, the membrane being disposed on the adapter, the adapter being secured to the hollow body so that it is in communication with the hollow chamber.

In accordance with yet a further feature of the invention, the actuator includes at least another elastic membrane for closing at least another opening formed in the hollow body.

In accordance with a concomitant feature of the invention, the membranes, which are preferably two in number, are disposed on the hollow body in such manner that the respective deformation deflections thereof are substantially additive, provided that they are disposed at an angle with respect to one another. If two membranes are located diametrically opposite one another, an addition of the deflections thereof occurs. The advantage of this construction lies in the fact that although a smaller expansion of the individual membranes occurs, a respectively great or long total adjustment path of the actuator is attained.

Other features which are considered as characteristic for the invention are set forth in the appended claims.

Although the invention is illustrated and described herein as embodied in a piezoelectric actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
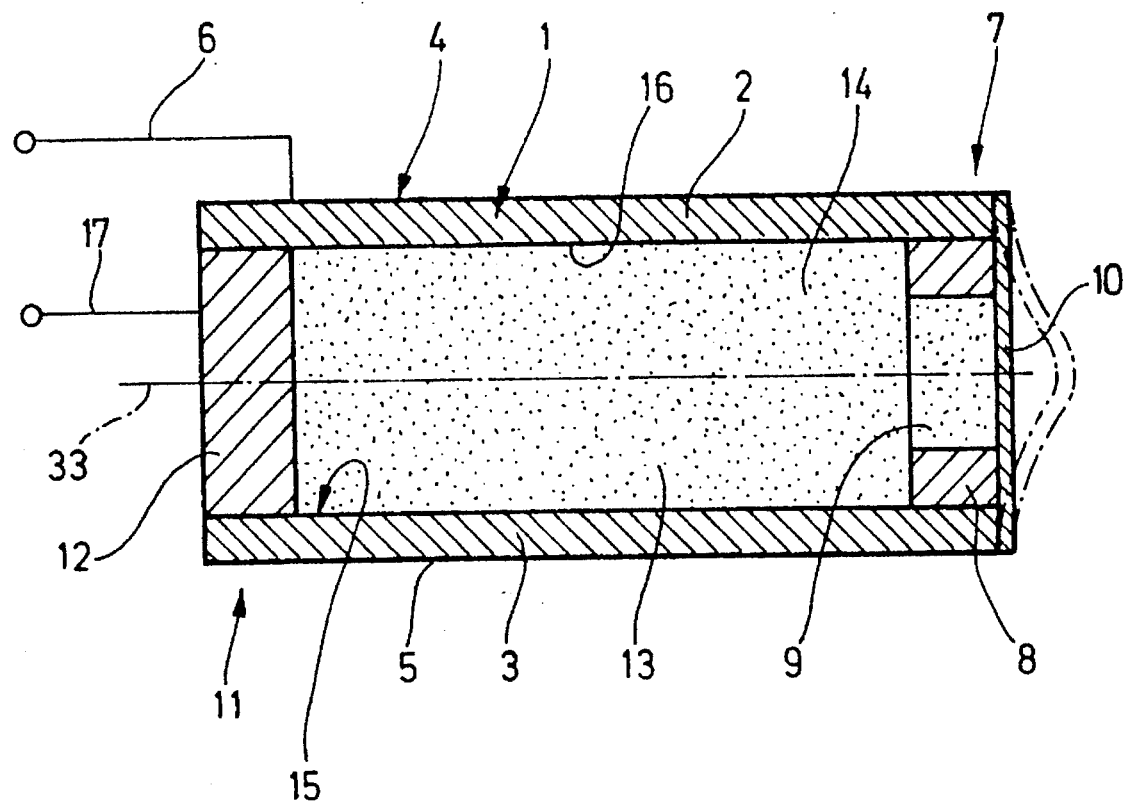
FIG. 1 is a longitudinal sectional view of a first and preferred embodiment of a piezoelectric actuator, according to the invention, especially a linear-acting actuator having a tubular construction.

Referring now to the drawings and, first, particularly to FIG. 1 thereof, there is shown therein a preferred embodiment of a piezoelectric actuator, constructed as a linear actor. It has a hollow body 1 formed as a tube 2 with a circular cross section. The tube 2 is formed of piezoelectric material so that it constitutes a piezoelectric element 3. An electrode 5 is disposed on the outer cylindrical or casing surface 4 of the tube 2 and is connectible by an electrical lead 6 to one pole of a non-illustrated control-voltage source. A membrane carrier or support 8 is disposed at a first end 7 of the tube 2. The membrane carrier 8 is formed as a ring member which has a central hole 9 and is sealingly inserted into the interior of the tube 2. Carried thereby is an elastic membrane 10 which sealingly closes the tube 2 in the vicinity of the first end 7 thereof. A sealing member 12 is disposed at the other or second end 11 of the tube 2, and closes the tube 2 so as to define a hollow chamber 13 therewithin. The hollow chamber 13 is filled with an incompressible liquid 14. An inner cylindrical or casing surface 15 of the tube 2 has an electrode 16 disposed thereon and electrically connected to the sealing member 12, which is connected to an electrical lead 17 which, in turn, is connectible to the other pole of the aforementioned non-illustrated control-voltage source.

If a control voltage is applied between the two electrodes 5 and 16, the geometry of the tube 2 is changed, resulting in a reduction of the volume of the hollow chamber 13, due to the piezoelectric effect. Because the hollow chamber 13 is filled with the incompressible liquid 14 and the liquid volume accordingly remains constant, the membrane 10 is deflected as represented in phantom in FIG. 1. The membrane 10 is thus arched outwardly so that the total length of the actuator is increased. Depending upon the extent of the deflection of the membrane 10, a corresponding adjustment path of the piezoelectric actuator is set. The extent of the deflection depends upon the amount of the applied control voltage. If the control voltage is switched off, the hollow body 1 again assumes the original shape thereof, i.e., the membrane 10 returns to the original position thereof.

Figure 2:
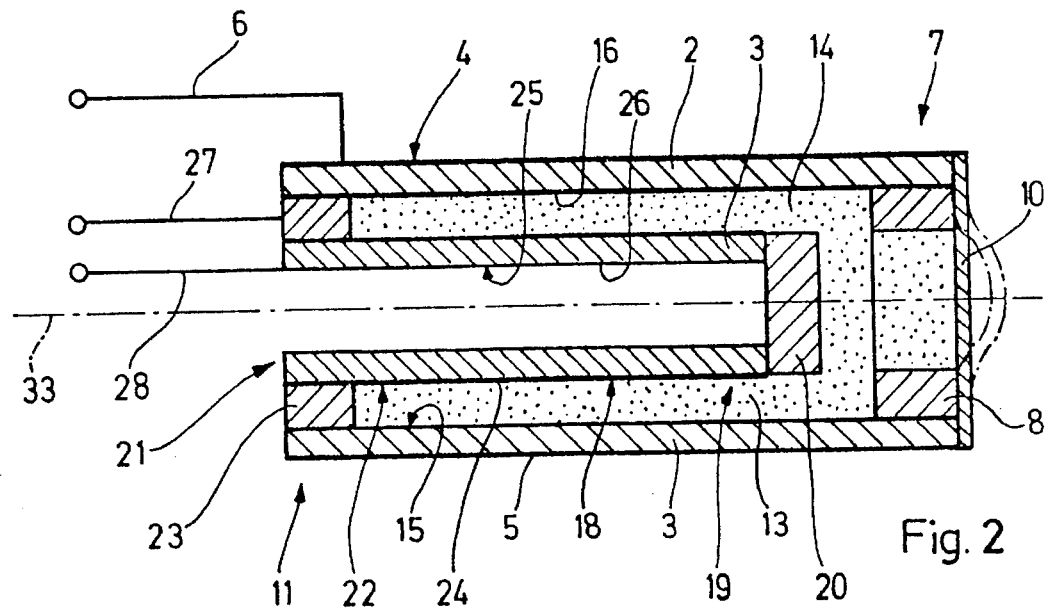
FIG. 2 is a view like that of FIG. 1 of a second embodiment of the piezoelectric actuator which is formed with two coaxial tubes.

FIG. 2 shows a second embodiment of the piezoelectric actuator which corresponds substantially to the embodiment thereof shown in FIG. 1. The foregoing comments regarding the embodiment of FIG. 1 are generally applicable as well to the embodiment of FIG. 2. Moreover, the piezoelectric actuator of the embodiment shown in FIG. 2 has another tube 18 disposed within the tube 2 which is thus an outer tube. The tubes 2 and 18 are disposed coaxially to one another, the inner tube 18 being formed shorter than the outer tube 2. Like the tube 2, the tube 18 is also formed of piezoelectric material. The first end 7 of the outer tube 2 of FIG. 2, as in the embodiment of FIG. 1, is provided with a membrane carrier 8 as well as a membrane 10. A first end 19 of the inner tube 18, which is closed by a closure member 20, is disposed at a spaced distance opposite from the membrane carrier 8. The second end 11 of the outer tube 2 is aligned with a second end 21 of the inner tube 18. A sealing ring 23 closing off a hollow chamber 13 formed between the tubes 2 and 18 is located in the vicinity of the ends 11 and 21 between the inner casing surface 15 of the outer tube 2 and the outer casing surface 22 of the inner tube 18.

The outer casing surface 22 of the inner tube 18 is provided with an electrode 24, and the inner casing surface 25 of the inner tube 18 with an electrode 26. The sealing ring 23 is electrically conductive and connected to an electrical lead 27. Another electrical lead 28 is connected to the electrode 26. In this respect, a lead 6 extends to the electrode 5 on the outer casing surface 4 of the outer tube 2; the lead 27 extends via the electrically conductive sealing ring to the electrode 16 on the inner casing surface 15 of the outer tube 2 and also to the electrode 24 on the outer casing surface 22 of the inner tube 18; and the lead 28 extends to the electrode 26 on the inner casing surface 25 of the inner tube 18. The electrodes mentioned within the course of this specification may, for example, be in the form of metallic layers or coatings applied to the piezoelectric elements.

A control voltage is applied to the leads 6, 27 and 28 in such a manner that the volume of the hollow chamber 13 located for the most part between the tubes 2 and 18 is reduced, as a result of which the incompressible liquid 14 present in the hollow chamber 13 deflects the membrane 10 as indicated in phantom in FIG. 2. Preferably, the control voltage is polarized so that the diameter of the outer tube 2 is reduced, the diameter of the inner tube 18 being simultaneously increased. This results in a relatively great reduction in volume of the hollow chamber 13 and, accordingly, in a relatively long adjustment path, because the membrane 10 arches or bulges outwardly for a corresponding distance.

Figure 3:
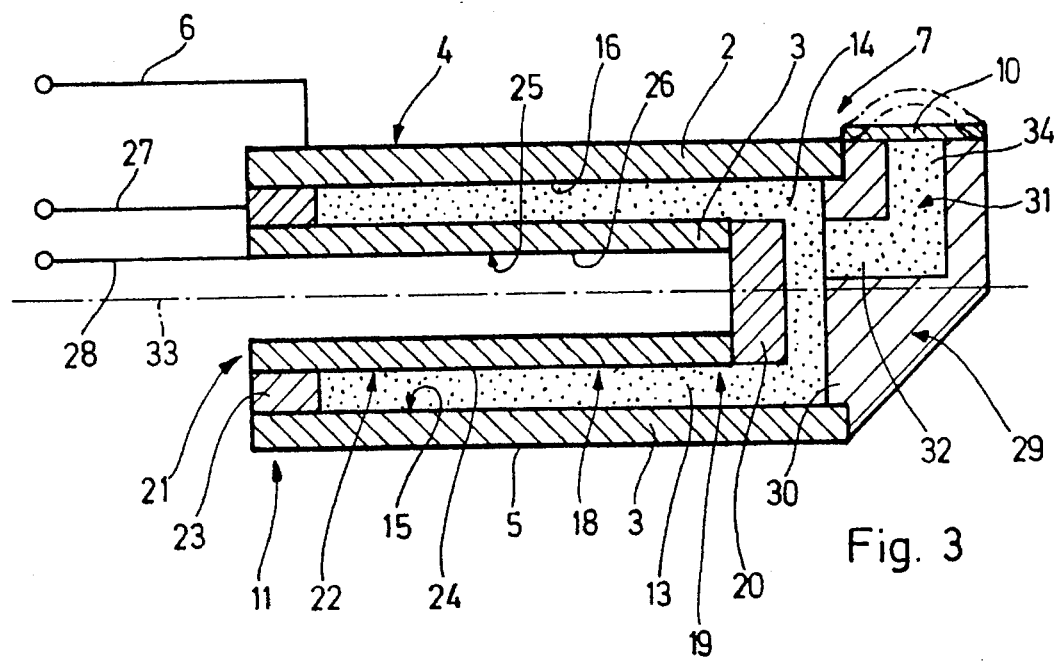
FIG. 3 is a view like that of FIG. 2 of a third embodiment of the piezoelectric actuator which differs from the embodiment of FIG. 2 in that it is provided with an adapter for diverting or deflecting the operating direction thereof.

FIG. 3 illustrates a third embodiment of the invention which corresponds for the most part to the second embodiment of FIG. 2, so that reference can also be made to the foregoing description for an understanding of the third embodiment of FIG. 3. The construction in the vicinity of the first end 7, however, differs from that of the second embodiment of FIG. 2. A special membrane carrier, which is formed as an adapter 29 for deflecting the operating direction, is used in the third embodiment of FIG. 3. It has a connecting piece 30 with which it sealingly engages in the end 7 of the outer tube 2. It is furthermore provided with an angular channel 31 having one leg 32 extending in the direction of the longitudinal axis 33 of the tube 2, and another leg 34 disposed transversely, i.e., at an angle, to the longitudinal axis 33. In the illustrated third embodiment, this angle is 90°; it may, however, deviate from 90° in other non-illustrated embodiments of the invention. The membrane 10 is disposed on the end of the leg 34 of the angular channel 31, i.e., the surface of the membrane 10 lies at an angle to the end face of the outer and the inner tubes 2 and 18, respectively. A piezoelectric actuator or actor is thereby formed which is adjustingly movable in a direction extending perpendicularly to the main or longitudinal axis 33 of the hollow body 1 formed by the tubes 2 and 18. The manner in which the third embodiment of FIG. 3 functions or operates corresponds to the manner aforedescribed with respect to the second embodiment of FIG. 2, so that it is believed to be unnecessary to repeat it.

Figure 4:
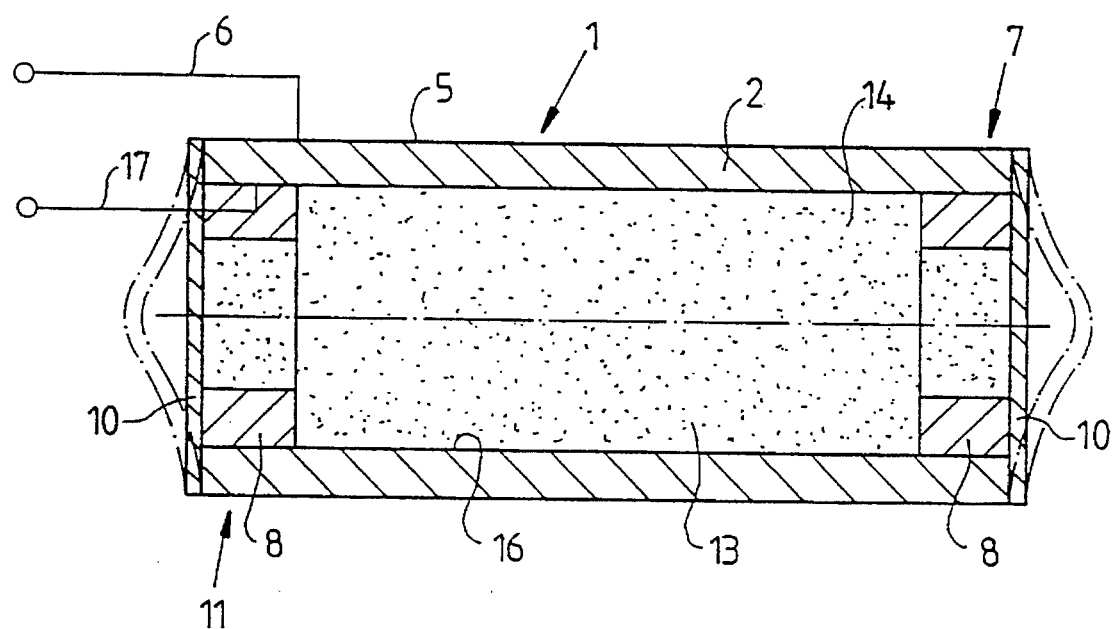
FIG. 4 is a view like that of FIG. 1 of a fourth embodiment of the piezoelectric actuator having two membranes.

FIG. 4 shows another embodiment of the invention which corresponds to the first embodiment of FIG. 1. The foregoing description of FIG. 1 is therefore applicable thereto. The embodiment of FIG. 4 deviates from that of FIG. 1, however, in that, not only is the first end 7 provided with a membrane 10, but also the second end 11 is provided with another membrane 10. Instead of the sealing member 12 of FIG. 1, a membrane carrier 8 is disposed in the tube 2 at the second end 11 thereof, and carries the other membrane 10. The embodiment of FIG. 4 offers the advantage that, for an adjustment path like that of the embodiment of FIG. 1, the two membranes 10 of FIG. 4 need have only a slight deflection, respectively, preferably only one-half the deflection path, so that the expansion of the individual membrane 10 does not have to be as great as is required for the embodiment of FIG. 1.

The hollow body 1 of the aforedescribed embodiments are of such dimensions that, in essence a deformation only of the membrane or membranes 10, and not of the casing, occurs due to the hydraulic pressure which is generated. By relatively simply prescribing the dimensioning of the lengths and diameters of the tube 2 and the pair of tubes 2, 18, respectively, and/or a corresponding dimensioning of the areas of the membrane or membranes 10, the desired maximal adjustment path may be realized. It is readily possible to attain adjustment paths which are greater than 100 µm in length. By means of slight structural variations, for example, by means of the adapter for deflecting the operating direction which is illustrated in FIG. 3, it is possible to alter the operating direction arbitrarily with respect to the main or longitudinal axis of the piezoelectric actuator or actor. The actuator or actor according to the invention requires relatively low production costs and permits a wide application. It is particularly possible to utilize it as an adjustment element for printing presses. For example, inking-zone metering may be performed therewith. Thus, the inking zones of a printing press are able to be remotely adjusted by means of piezoelectric actuators constructed in accordance with the invention. It is furthermore possible to install such actuators or actors as a displacement drive for grippers in printing presses, for example, for grippers of such printing presses taking part in paper transport.

I claim:

1. Piezoelectric actuator having at least one piezoelectric element assigned to an electrode for applying a control voltage, comprising a hollow body in the form of a first tube having a closed chamber formed therein filled with an incompressible liquid, a liquid-tight elastic membrane closing an opening formed in said hollow body, means for controlling the piezoelectric element so as to vary said volume of said hollow body during a deformation of said elastic membrane caused by said incompressible liquid, and a second tube, one of said tubes being received within the other.

2. Actuator according to claim 1, wherein said first tube is formed with at least one wall, the piezoelectric element forming at least one section of said hollow-body wall.

3. Actuator according to claim 1, wherein the piezoelectric element forms said first tube.

4. Actuator according to claim 2, wherein at least said one section of said first tube wall is coated with an electrode.

5. Actuator according to claim 4, wherein said wall is an outer casing defining a hollow chamber in said first tube, and wherein the piezoelectric element forms at least one region of a surface of said outer casing, said surface region being coated with another electrode.

6. Actuator according to claim 1, wherein said elastic membrane is disposed at an end of said one tube.

7. Actuator according to claim 1, wherein said first and second tubes are coaxially disposed.

8. Actuator according to claim 1, including at least another elastic membrane for closing at least another opening formed in said hollow body.

9. Actuator according to claim 8, wherein said membranes are disposed on said hollow body in such manner that the respective deformation deflections thereof are substantially additive.

10. Piezoelectric actuator having at least one piezoelectric element assigned to an electrode for applying a control voltage, comprising a hollow body having a closed chamber formed therein filled with an incompressible liquid, a liquid-tight elastic membrane closing an opening formed in said hollow body, and means for controlling the piezoelectric element so as to vary said volume of said hollow body during a deformation of said elastic membrane caused by said incompressible liquid, wherein said hollow body is formed of at least one tube and wherein said at least one tube is formed of piezoelectric material.

11. Piezoelectric actuator having at least one piezoelectric element assigned to an electrode for applying a control voltage, comprising a hollow body having a volume filled with an incompressible liquid, an elastic membrane closing an opening formed in said hollow body, and means for controlling the piezoelectric element so as to vary said volume of said hollow body during a deformation of said elastic membrane caused by said incompressible liquid, wherein said hollow body is formed of an outer tube and an inner tube received in said outer tube, and at least part of a hollow chamber is defined between an outer casing surface of the inner tube and an inner casing surface of the outer tube.

12. Actuator according to claim 11, wherein the inner tube is formed shorter than the outer tube, and including surface means for closing a first end of the inner tube, said closing surface means forming a section of walls defining said hollow chamber.

13. Actuator according to claim 12, wherein said membrane is disposed at a first end of the outer tube at a spaced distance opposite from said first end of the inner tube.

14. Actuator according to claim 13, including a sealing ring closing said hollow chamber in vicinity of respective second ends of the two tubes, said sealing ring being disposed between said outer casing surface of the inner tube and said inner casing surface of the outer tube.

15. Actuator according to claim 14, including respective electrodes coating said outer casing surface of the inner tube, and said inner casing surface of the outer tube, said sealing ring forming an electrical connecting element for said electrodes.

16. Actuator according to claim 11, including an adapter for deflecting the operating direction of the actuator, said membrane being disposed on said adapter, said adapter being secured to said hollow body so that it is in communication with said hollow chamber.

17. Piezoelectric actuator having at least one piezoelectric element assigned to an electrode for applying a control voltage, comprising a hollow body having a closed hollow chamber formed therein filled with an incompressible liquid, an elastic membrane closing an opening formed in said hollow body, and means for controlling the piezoelectric element so as to vary said volume of said hollow body during a deformation of said elastic membrane caused by said incompressible liquid, and an adapter for deflecting an operating direction of the actuator, said membrane being disposed on said adapter, and said adapter being secured to said hollow body so that it is in communication with said hollow chamber.

* * * * *